US008489671B2

(12) United States Patent
Lepeska (10) Patent No.: US 8,489,671 B2
(45) Date of Patent: Jul. 16, 2013

(54) DEDICATED SHARED BYTE CACHE

(75) Inventor: Peter Lepeska, Boston, MA (US)

(73) Assignee: ViaSat, Inc., Carlsbad, CA (US)

( * ) Notice: Subject to any disclaimer, the term of this patent is extended or adjusted under 35 U.S.C. 154(b) by 476 days.

(21) Appl. No.: 12/557,395

(22) Filed: Sep. 10, 2009

(65) Prior Publication Data

US 2010/0070570 A1    Mar. 18, 2010

Related U.S. Application Data (60) Provisional application No. 61/095,751, filed on Sep. 10, 2008.

(51) Int. Cl.
*G06F 15/16* (2006.01)
*G06F 15/173* (2006.01)

(52) U.S. Cl.
USPC ............................ 709/203; 709/200; 709/223

(58) Field of Classification Search
USPC ............................... 709/200, 203, 223; 726/3
See application file for complete search history.

(56) References Cited

U.S. PATENT DOCUMENTS

| | | | |
|---|---|---|---|
| 6,253,234 B1 | 6/2001 | Hunt et al. | |
| 2002/0091792 A1 | 7/2002 | Janniello | |
| 2002/0143984 A1 | 10/2002 | Hudson Michel | |
| 2003/0005228 A1 | 1/2003 | Wong et al. | |
| 2003/0018694 A1* | 1/2003 | Chen et al. | 709/200 |
| 2003/0051236 A1* | 3/2003 | Pace et al. | 717/177 |
| 2003/0097564 A1* | 5/2003 | Tewari et al. | 713/171 |
| 2003/0154266 A1* | 8/2003 | Bobick et al. | 709/223 |
| 2004/0128346 A1* | 7/2004 | Melamed et al. | 709/203 |
| 2005/0050547 A1 | 3/2005 | Whittle et al. | |
| 2006/0047718 A1* | 3/2006 | Keith et al. | 707/204 |
| 2007/0162462 A1* | 7/2007 | Zhang et al. | 707/10 |
| 2008/0200207 A1 | 8/2008 | Donahue et al. | |
| 2010/0017600 A1 | 1/2010 | Lepeska et al. | |
| 2010/0299722 A1* | 11/2010 | Tewari et al. | 726/3 |
| 2011/0302266 A1 | 12/2011 | Lowery et al. | |

OTHER PUBLICATIONS

Frantzeskou et al., "Effective Identification of Source Code Authors Using Byte-Level Information," ACM, New York, USA, May 20-28, 2006, pp. 893-896, XP040040085 Shanghai, China.
S. Selvakumara, P. Prabhakar "Implementation and comparison of distributed caching schemes," Computer Communications 24 (2001) pp. 677-684.
S. Paula, Z. Feib "Distributed caching with centralized control," Computer Communications 24 (2001) pp. 256-268.

(Continued)

*Primary Examiner* — David Lazaro
*Assistant Examiner* — Vitali Korobov
(74) *Attorney, Agent, or Firm* — Kilpatrick Townsend & Stockton LLP (57) ABSTRACT

The present invention relates to methods, apparatus, and systems for providing peer-to-peer network acceleration. The system includes a content server configured to transfer content based on received requests for content. The system further includes a proxy server coupled with the content server. The proxy server is configured to receive content from the content server and to forward the received content. Furthermore, the system includes client systems coupled with the proxy server. The client systems each include a personal byte cache and are configured to receive content from the proxy server, to store content in the personal byte caches, to synchronize the personal byte caches with each of the plurality of client system's portions of a shared byte cache, and to retrieve content from the shared byte cache.

8 Claims, 7 Drawing Sheets

OTHER PUBLICATIONS

Non-final Office Action issued May 8, 2012 in U.S. Appl. No. 12/503,760.

Final Office Action issued Sep. 27, 2012 in U.S. Appl. No. 12/503,760.

* cited by examiner

DEDICATED SHARED BYTE CACHE

PRIORITY CLAIM

This application claims priority to U.S. Provisional Application No. 61/095,751, entitled METHODS AND SYSTEMS FOR IMPLEMENTING A DEDICATED SHARED BYTE CACHE, filed on Sep. 10, 2008, which is incorporated by reference in its entirety for any and all purposes.

FIELD OF THE INVENTION

The present invention relates, in general, to caching and, more particularly, to implementing a dedicated shared byte cache.

BACKGROUND

Typically, a branch office may be connected with a proxy server which is configured to accelerate communications between client systems at the branch office and content servers. As client systems receive content (e.g., web pages, documents, application files, image files, etc.) from the content servers, the client systems each store the content in a personal byte cache. Thus, each personal byte cache would include different content depending on the content received by each client system. In order to support the use of the shared byte cache to receive warm cache hits on uploads, the client systems would need to continually communicate with each other about the data they have stored in their personal byte caches. This adds quite a bit of complexity as it requires inter-client machine communication and an increase in network traffic. Hence, improvements in the art are needed.

BRIEF SUMMARY

Embodiments of the present invention are directed to a system for implementing a dedicated shared byte cache. The system includes a content server configured to transfer content based on received requests for content. The system further includes a proxy server coupled with the content server. The proxy server is configured to receive content from the content server and to forward the received content. Furthermore, the system includes client systems coupled with the proxy server. The client systems each include a personal byte cache and are configured to receive content from the proxy server, to store content in the personal byte caches, to synchronize the personal byte caches with each of the plurality of client system's portions of a shared byte cache, and to retrieve content from the shared byte cache.

Another embodiment is directed to a method of implementing a dedicated shared byte cache. The method includes generating, at a plurality of client systems, requests for content, receiving, at a proxy server, the requests for content, and forwarding, from the proxy server to a content server, the requests for content. The method further includes receiving, at the content server, the requests for content, transferring the content to the proxy server, and receiving the content at the proxy server. Furthermore, the method includes transferring the content requested by each of the plurality of client systems to the corresponding client system, storing, within a personal byte cache associated with each of the plurality of client systems, the requested content, and synchronizing each of the personal byte caches with a shared byte cache, wherein each of the plurality of client systems is apportioned a portion of the shared byte cache.

In yet another embodiment a system for implementing a dedicated shared byte cache is described. The system includes a content server configured to transfer content based on received requests for content. The system further includes a gateway in communication with the content server. The gateway includes a gateway accelerator module. The gateway accelerator module includes a proxy server, and the proxy server is configured to receive content from the content server and to forward the received content. The system further includes a satellite in communication with the gateway, and the satellite is configured to transmit the received content. Furthermore, the system includes a subscriber terminal in communication with the satellite. The subscriber terminal configured to receive the transmitted content.

The system includes client systems in communication with the subscriber terminal. The client systems each include a personal byte cache and the client systems are configured to receive content from the proxy server, to store content in the personal byte caches, to synchronize the personal byte caches with each of the plurality of client system's portions of a shared byte cache, and to retrieve content from the shared byte cache.

In an alternative embodiment, a machine-readable medium is described. The machine-readable medium includes instructions for generating, at a plurality of client systems, requests for content, receiving, at a proxy server, the requests for content, and forwarding, from the proxy server to a content server, the requests for content. The machine-readable medium further includes instructions for receiving, at the content server, the requests for content, transferring the content to the proxy server, and receiving the content at the proxy server. Furthermore, the machine-readable medium includes instructions for transferring the content requested by each of the plurality of client systems to the corresponding client system, storing, within a personal byte cache associated with each of the plurality of client systems, the requested content, and synchronizing each of the personal byte caches with a shared byte cache, wherein each of the plurality of client systems is apportioned a portion of the shared byte cache.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

The ensuing description provides exemplary embodiment(s) only and is not intended to limit the scope, applicability or configuration of the disclosure. Rather, the ensuing description of the exemplary embodiment(s) will provide those skilled in the art with an enabling description for implementing an exemplary embodiment. It should be understood that various changes may be made in the function and arrangement of elements without departing from the spirit and scope as set forth in the appended claims.

Aspects of the disclosure relate to generating a dedicated shared byte cache. For example, suppose a branch office includes two hundred client systems within a subnet. The branch office may also be connected with a proxy server which is configured to accelerate communications between the client systems and content servers. As client systems receive content (e.g., web pages, documents, application files, image files, etc.) from the content servers, the client systems each store the content in a personal byte cache. Thus, each personal byte cache would include different content depending on the content received by each client system.

Typically, the personal byte caches are only used by each individual client system and the content stored within the personal byte caches does not benefit other client systems within the subnet. However, in many instances the content stored in one client system's personal byte cache may be useful to another client system and visa versa. For example, a mass email to all employees within the branch office may be sent and, instead of each client retrieving the email message from the mail server, it would be advantageous for one client to initially receive the email and the other clients to retrieve the same email from the client which has already retrieved the email, thus sparing the other client systems from making the round trip to the mail server, reducing usage of bandwidth and server resources, etc.

Accordingly, aspects of the present invention include implementing a dedicated shared byte cache within the subnet. In one embodiment, the dedicated shared byte cache may be a computer system within the subnet, a client system, or other server. Ultimately, the byte cache system should simply be able to be accessed by the client systems and have sufficient storage space to accommodate storing each of the client systems' personal byte cache data. Hence, each client system may be configured to synchronize the content in its personal byte cache with the shared byte cache. The shared byte cache is a centralized byte cache which represents each of the client system's personal byte caches. As such, each client system within the subnet essentially has full access to the data within the client system's personal byte caches.

In a further embodiment, each client system synchs up its personal byte cache file with the file that the client is sharing on the dedicated file server. This means that if a client system goes home and downloads a 10 MB file, when the client returns to the office, the personal byte cache will overwrite the shared one and then all other users in the branch office can use the 10 MB file of data for warm byte cache hits.

The proxy server keeps track of which clients are co-located and connected to the same shared branch office byte cache machine. This may be accomplished by having the client send information about what branch office byte caching machine it is actively reading from and writing to at the time the client logs on to the proxy server. When the proxy server is encoding during the processing of a file transfer, the proxy server knows what data is stored in the dedicated shared byte cache merely by summing up what each client reports it contains in its own personal byte cache. Hence, there is no need for a separate synching process between the proxy server and the dedicated byte cache machine.

Further, three exemplary architectures, for supporting a shared byte cache in the branch office without falling back to the typical WAN appliance architecture that does not use client software, are described below:

The first exemplary architecture is a pure peer-to-peer architecture where client A gets bytes directly from client B at runtime in order to get a warm cache hit using shared data. One advantage is that there is no redundant storage of data. Also, there is no need to transfer shared cache updates across the network.

The second exemplary architecture includes neighbor cache preloading and/or synching where all clients in a subnet maintain both a personal byte cache and a shared byte cache file. The shared file is updated via local subnet broadcasts sent by each client as it transfers data (i.e., basically echoing what is written to its own personal cache file to the subnet for all other clients to receive updates to their personal cache). Client A receives bytes from client B that are stored in the encrypted shared byte cache on client A's local hard drive in order to get a warm cache hit using shared data. One advantage of this implementation is its simplicity of design.

The third exemplary architecture is a dedicated shared byte cache, described below, where client A receives bytes from client B indirectly by requesting that data from the dedicated shared machine in order to get a warm cache hit using shared data. There is less redundant storage as each 1 MB page is stored exactly twice, and this implementation may use a standard file server for hosting the shared byte cache. In one embodiment, the standard file server may be a CIFS server, a SMB server, a NFS server, a FTP server, and a HTTP server, or the like. Furthermore, the standard file serve may not be running any proprietary software for running and/or maintaining the dedicated shared byte cache.

Furthermore, the following are two possible implementations of a dedicated shared branch office byte cache. The first possible implementation is using acceleration software on the byte cache machine (such as using a neighboring peer to act as a byte cache). A particular case is that of a P2P PEP which has a neighboring peer act as a dedicated byte cache for all other peers in the branch, meaning it would not itself be used exclusively by any user but would just serve as a shared byte cache for the other users in the branch. The peers would need to echo their personal data to this dedicated peer. This implementation has the advantage that users will not need to retrieve data directly from a neighboring client machine at runtime. Not only is the state of the client machine not reliably controlled, as the user of the client machine may be utilizing the CPU or disk intensively or rebooting, at runtime but also the burden of acting as a server to neighboring peers could potentially cause or be blamed for bad client machine performance. The dedicated byte cache machine does not have these issues.

The second possible implementation is using a standard file server (use of a standard file server located in the branch as a dedicated shared byte cache instead of using a dedicated peer running proprietary software). This has a significant advantage in terms of simplicity, supportability, and ease of deployment. Enterprises often have file servers in the branch that can be used for temporary data such as a byte cache. Alternatively, one of the users in the branch, perhaps the manager, can host the dedicated shared byte cache by creating a standard file share. Some of the implementation details for this approach include the following:

Each user would write its own file hosted on the file share, and the file name would include the session ID. Such a session ID is unique across all users in the branch at any given time, which allows the proxy server to direct a client running session ID X on machine Y to use data in the shared cache from a client with session ID A to de-compress a block of data and the client with session ID X will be able to find the session ID A file on the standard file server to read the block of data. Each user would also write the data he/she had transferred to his/her own personal file located on the machine's local hard drive, which allows the user to receive the benefit of byte caching when the user is mobile and is unable to connect to the shared byte cache on the standard file server.

For Example, when the proxy server is processing a download for client A, the proxy server can identify that a given long sequence of bytes has been previously downloaded by client B, and stored in client B's byte cache file on the shared file server. The proxy server would then notify client A which file to open and which byte range to read to from client B's byte cache file as an alternative to transferring the byte sequence again across the WAN from the proxy server to client A. Hence, each file stored on the dedicated shared byte cache file server is opened for writing by one user and potentially opened for reading only by multiple users simultaneously. In order to prevent users from being able to view the byte caches of other users in the branch office, a new account would be created on the dedicated shared byte cache file server that is used exclusively by the acceleration software, and only "thin" accounts would be given read/write permissions to the dedicated shared byte cache folder.

Figure 1:
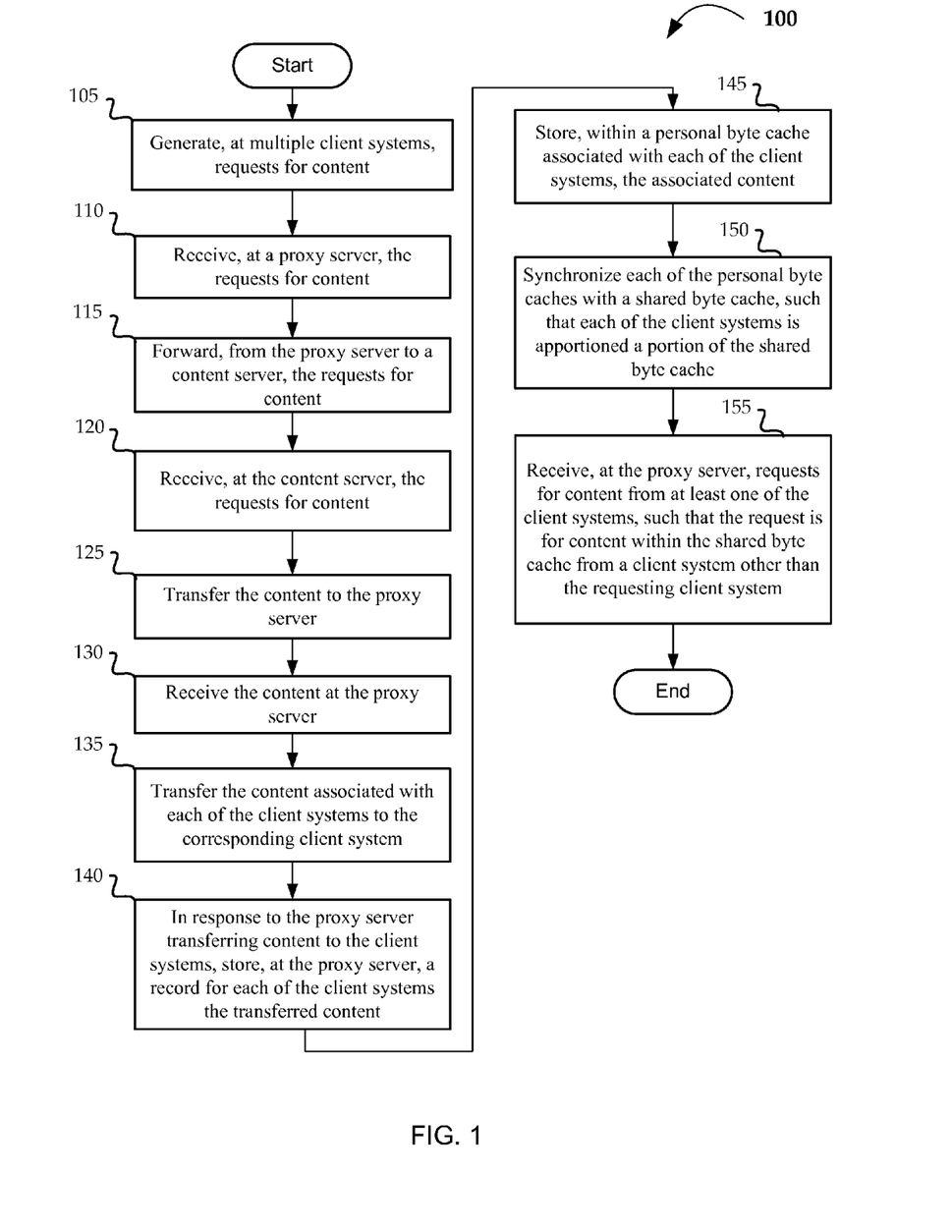
FIG. 1 is a flow diagram illustrating a method of implementing a dedicated shared byte cache, according to one embodiment of the present invention.

Turning now to FIG. 1, which illustrates a method 100 for implementing a dedicated shared byte cache. At process block 105, requests for content (e.g., text documents, application-specific documents, image files, audio files, video files, application related files, etc.) may be generated for multiple client systems. The client systems may be included within, for example, a subnet, a branch office, a local area network (LAN), wide area network (WAN), etc. Furthermore, the client systems may be configured to have a proxy server process each of the client system's content requests in order to provide network acceleration.

Accordingly, at process block 110, the content requests from the client systems may be received at the proxy server. The proxy server may be situated between the client systems and the content servers (e.g., a mail server, a web server, a file server, a database server, etc.). The proxy server may be configured to accelerate network communications between the content servers and the client systems.

At process block 115, the proxy server may then forward the content requests to the respective content servers on behalf of the client systems. The content servers then receive the forwarded requests (process clock 120). Accordingly, the content servers, in response to the received requests, transmit the requested content to the proxy server and the content is received at the proxy server (process blocks 125 and 130).

At process block 135, the proxy server proceeds to transfer the content to each of the corresponding client systems. For example, if client A requested a 10 megabyte video file, then that video file would be transferred to client A, whereas if client B requested a 1 megabyte image file, that image file would be transferred to client B. The proxy server is configured to continue to transfer the requested content to the corresponding requesting client systems such that each client system receives their requested content.

As the proxy server transfers content to the respective client systems, the proxy server may store a record of the content that has been transferred to each client system (process block 140). In other words, the proxy server maintains a record of all of the content received by each of the client systems so that, at any given moment, the proxy server is aware of the content stored at each client system. Furthermore, each client system includes a storage device for storing a personal byte cache. The client systems utilize the personal byte cache to store the content received from the proxy server (process block 145). For example, each client may have a personal byte cache of 10 gigabytes each; however, other sizes may be used. Accordingly, as the personal byte caches are filled, the older content within the cache is removed and replaced with the new content. As such, since the proxy server knows the content that has been transferred to each client system, as well as the size of the content and the size of the personal byte cache, the proxy server is continuously aware of the content that is stored in each client systems' personal byte cache.

Furthermore, included within the subnet may also be a system which maintains the dedicated shared byte cache. Such a system may be a computer system set aside for the task, it may be a client system, etc. In any case, the dedicated shared byte cache may be configured to provide sufficient storage to accommodate storing the content of the personal byte caches for each of the client systems within the subnet. In one embodiment, each client system within the subnet is provided with a portion of the dedicated shared byte cache (e.g., at least equal to the size of the client system's personal byte cache). For example, if a subnet includes one hundred client systems with 10 gigabytes of personal byte cache space, then the dedicated shared byte cache would include at least 10 terabytes of space (i.e., 100 clients at 10 gigabytes each). Nonetheless, one of ordinary skill in the art would appreciate that the sizes of the personal and shared byte caches may vary. Furthermore, each client system may be assigned an identifier used to tag the content and identify which client's personal byte cache supplied the content within the shared byte cache.

In an alternative embodiment, a standard file server may be used to host the dedicated shared byte cache. The standard file server may be any sort of file server located within the branch. Hence, an administrator does not need to add any special hardware and/or software in order to implement the dedicated shared byte cache. This implementation provides a significant advantage as far as simplicity, supportability, and ease of deployment. Enterprises often have file servers already installed in a branch that can be used for temporary data, such as a byte cache. Hence, by using a file server already running in the branch for the dedicated shared byte cache, a simple solution may be achieved. Alternatively, a client system within the branch (possibly the manager's machine) may be set up to host the dedicated shared byte cache by simply creating a standard file share.

In the standard file server embodiment, each client system would write to its own file hosted on the dedicated shared byte cache file server. This file is the user's portion of the dedicated shared byte cache and again it has the same data stored in the user's personal byte cache on his/her machine. In order to identify each client system's file, the file name on the dedicated shared byte cache file server would include the session ID or some other unique identifier that allows the server to distinguish one client from another on the subnet and one client's portion of the dedicated shared byte cache from the others on the file server. This identifier could be passed from the server to any of the client machines in order to inform them where to locate a given block of data within the dedicated shared byte cache. Note, each file stored on the dedicated byte cache file server can be opened for writing by only one client system, the one for whom the file is the user's portion of the dedicated shared byte cache, and also opened for reading by multiple other client systems simultaneously. In addition, in order to prevent client systems from being able to view the personal byte caches of other users in the branch office, a new account may be created on the dedicated shared byte cache file server. This new account may be used exclusively by the acceleration software running on the clients in the subnet and therefore only the acceleration software client instances using this account will be given read/write permissions to the dedicated shared byte cache folder on the file server.

Turning back again to FIG. 1, at process block 150, each of the client systems may be configured to synchronize the content within their personal byte caches with the their portion of the dedicated shared byte cache. The synchronization may be triggered after new content has been downloaded by the client system. As such, each instance that a client system downloads new content and stores that content in its personal byte cache, the client system then copies the newly downloaded content to the its portion of the dedicated shared byte cache. Accordingly, each client system's personal byte cache is consistently synchronized with its portion of the shared byte cache without requiring additional communication between the client system and the dedicated shared byte cache machine. In other words, the synchronization occurs automatically based on the downloading of new content.

Alternatively or in addition, the synchronization may occur upon a client system reconnecting to the subnet (i.e., after the client system has been connected at home, at another branch office, at a mobile location, etc.). For example, a client system may be away from the branch office and mobile. While the client system is mobile, it may download a 10 megabyte (MB) file from a webpage and store the file in its personal byte cache. Accordingly, upon reconnection to the subnet, the client system would synchronize its personal byte cache with the dedicated shared bytes cache and the synchronization would include the newly downloaded 10 MB file, even though the file was downloaded while outside the subnet. Accordingly, the personal byte cache will overwrite the client system's portion of the shared byte cache and then all of the other client systems within the branch can use that 10 MB file of data for warm byte cache hits. In addition, each instance that a client system reconnects with the subnet, the client system may send an update to the proxy server detailing the contents of the client system's personal byte cache. Hence, the proxy server is still aware of the client system's personal byte cache content. Furthermore, by virtue of the fact that each client system maintains a synchronized copy of its personal byte cache with the dedicated shared byte cache and the proxy server knows the content of each client system's personal byte cache, the proxy server is also aware of the content of the dedicated shared byte cache.

Furthermore, the proxy server may need to keep track of which client systems are co-located (i.e., located at the same branch) and connected to the same dedicated shared byte cache machine. This can be accomplished by the client system sending information about which branch office dedicated shared byte caching machine it is actively reading from and writing to when the client system logs in to the proxy server. This can also be accomplished by using broadcast/multicast communications between clients in the subnet to dynamically determine which clients are co-located. Since broadcast communications can be sent to a specific subnet, only clients on the same subnet would receive requests, which they could subsequently respond to from a given client machine. Each client on the subnet can then inform the server of the list of the IP addresses associated with the clients who responded to a multicast/broadcast request. Accordingly, the proxy server will always be aware of which client systems are active and which dedicated byte cache each client system is connected to.

At process block 155, the proxy server continues to receive/intercept content requests from client systems, and the proxy server is configured to check the dedicated shared byte cache (this is accomplished by simply checking each client system's personal byte cache contents) to determine if the content (or a portion of the content) is stored in the dedicated shared byte cache. If the content is stored in the dedicated shared byte cache, the proxy server can simply direct the requesting client to retrieve the content from the dedicated shared byte cache. This is much faster and more efficient than retrieving the content from the content server because the dedicated shared byte cache is located locally with the client systems within the same subnet which can afford significantly higher transfer rates than those of the content servers. In addition, redundant downloading of content is avoided such that bandwidth is freed up on bandwidth constrained WAN links. Furthermore, such an implementation seamlessly opens up each client's personal byte cache to every other client system within a subnet, while only keeping one redundant copy (i.e., one copy within the personal byte cache and one copy within the shared byte cache), and avoiding synchronization overhead with the proxy server (this is because the proxy server already knows each client's personal byte cache which means the proxy server by implication knows the content of the dedicated shared byte cache). Furthermore, it should be noted that only one of either the personal byte cache or the shared byte cache may be active at any given time. For example, the user's portion of the shared byte cache may be active if the client system is able to connect to the machine hosting the dedicated shared byte cache, and if the client system cannot connect to the machine, then the personal byte cache would be active (i.e., while the client system is traveling, remote, etc.). Hence, synchronization of the personal byte cache with the shared byte cache would occur once the client system is able to connect with the machine hosting the dedicated shared byte cache.

Figure 2:
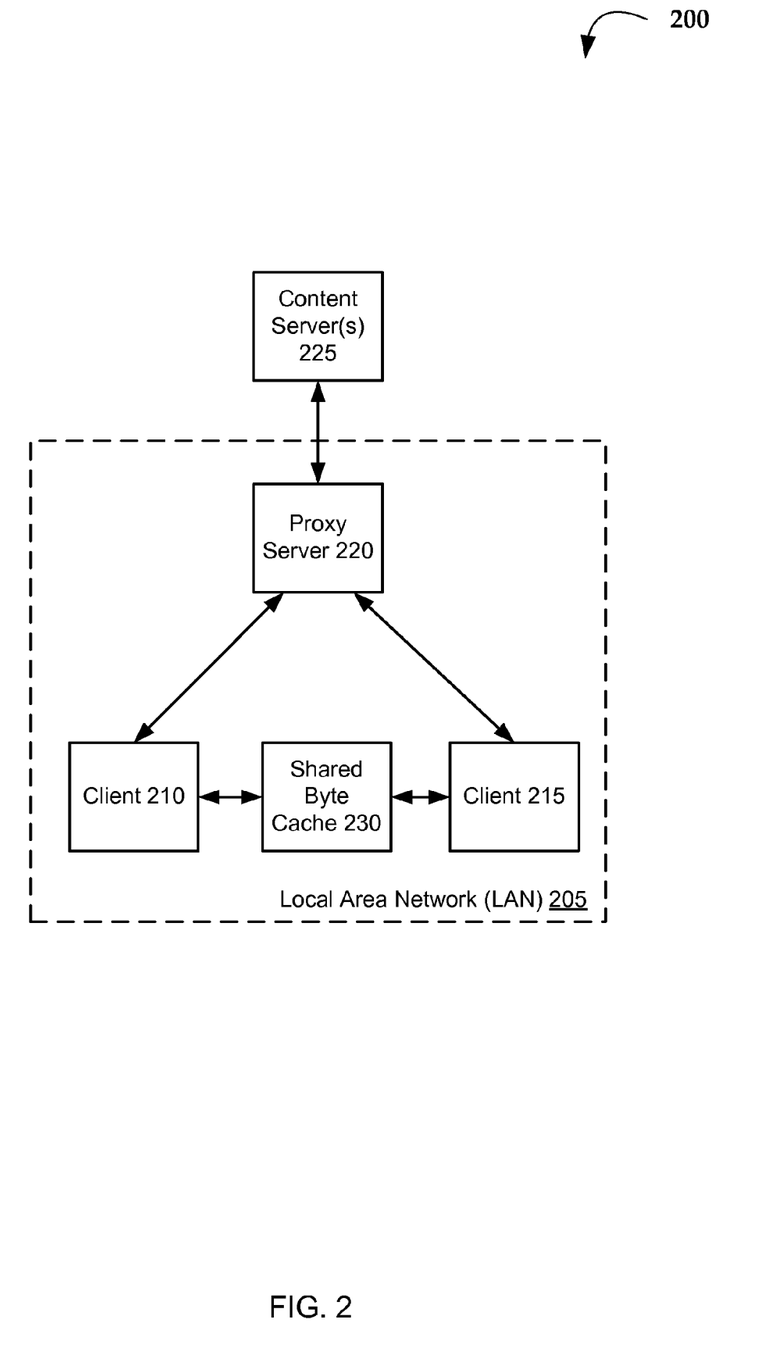
FIG. 2 is a block diagram illustrating a system for implementing a dedicated shared byte cache, according to one embodiment of the present invention.

Referring now to FIG. 2, which illustrates a system 200 for implementing a dedicated shared byte cache. In one embodiment, system 200 may include a LAN 205 (subnet or the like). LAN 205 may include clients 210 and 215 (more or fewer clients may be included; however, for illustrative purposes, only, two client systems are shown). As described above, clients 210 and 215 may be configured to transmit content requests which may be intercepted/received by a proxy server 220. Proxy server 220 may be configured to process the content requests for clients 210 and 215 and accelerate the transfer of the requested content.

In one embodiment, proxy server 220 requests the content associated with clients 210 and 215 from content server(s) 225. Content server(s) 225 may be, for example, a mail server, a file server, a web server, a file transfer protocol (FTP) server, a database server, etc. Content server(s) 225 transfer the requested content to proxy server 220 and proxy server 220 transfers the content to one or both of clients 210 and 215. Once clients 210 and 215 receive the requested content the content may be stored in a personal byte cache associated with each of clients 210 and 215.

Furthermore, as proxy server 220 transfers the content to clients 210 and 215, proxy server 220 tracks the content that each client has stored within the client's personal byte cache. Accordingly, proxy server 220 is made aware of the content within both clients 210 and 215. Once clients 210 and 215 receive the content and store it in their personal byte caches, clients 210 and 215 synchronize their personal byte caches with a shared byte cache 230 within LAN 205.

For example, shared byte cache 230 may include a file share or the like dedicated to each of clients 210 and 215. Thus, each instance either client 210 or 215 synchronizes with shared byte cache 230, the client opens a file write connection (e.g., an f open command) with the file corresponding to the client and writes the current content of the client's personal byte cache. Hence, shared byte cache 230 includes the personal byte caches of all of the clients within LAN 205. Accordingly, when proxy server 220 receives requests for content, proxy server 220 can check to determine if the requested content is contained in shared byte cache 230 by checking the personal byte cache content of clients 210 and 215. As such, if the content (or a portion of the content) being requested is contained within shared byte cache 230, proxy server 220 would direct the requesting client to retrieve the content from shared byte cache 230, which would provide a faster transfer rate among other benefits described above.

Figure 3:
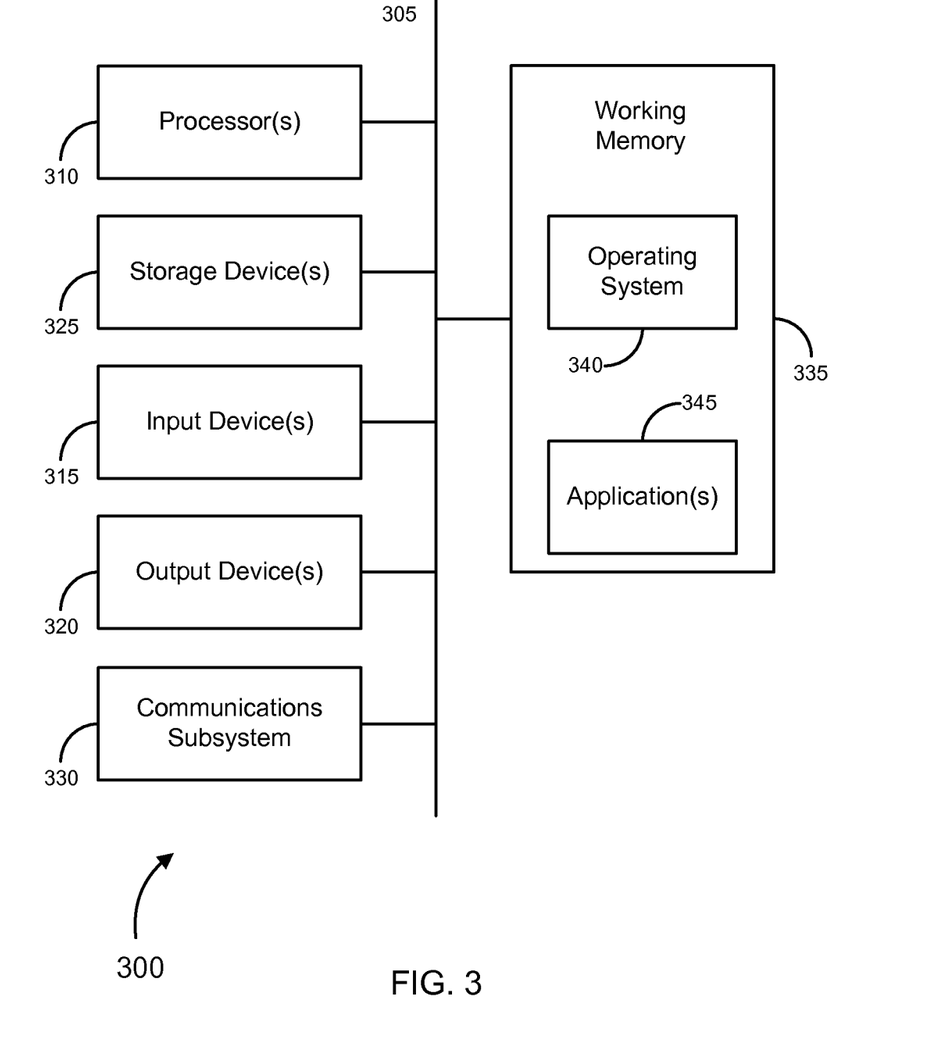
FIG. 3 is a generalized schematic diagram illustrating a computer system, in accordance with various embodiments of the invention.

FIG. 3 provides a schematic illustration of one embodiment of a computer system 300 that can perform the methods of the invention. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation, dynamic memory, such as the working memory 335. Transmission media includes coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation, radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
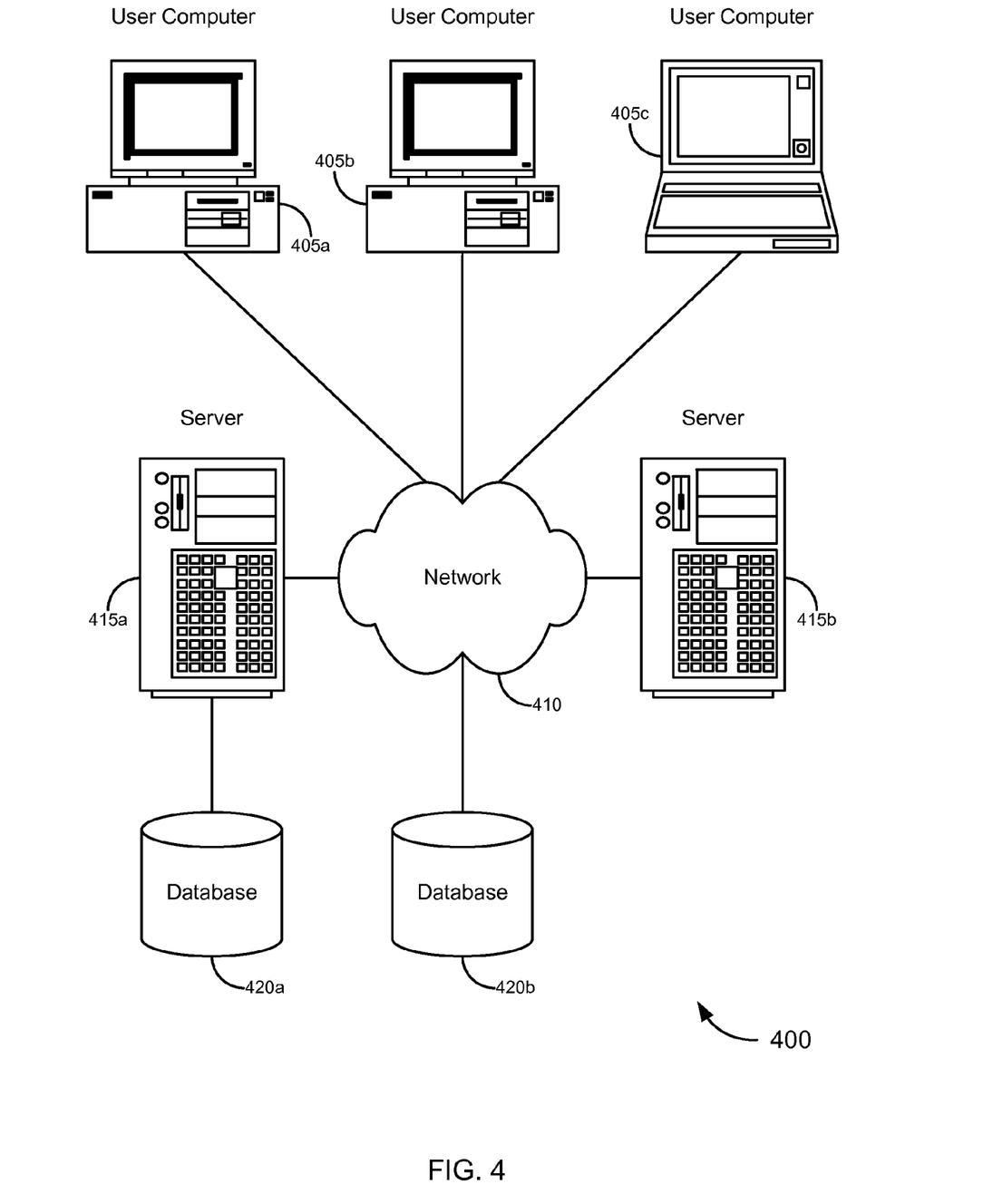
FIG. 4 is a block diagram illustrating a networked system of computers, which can be used in accordance with various embodiments of the invention.

A set of embodiments comprises systems for implementing dedicated shared byte caches. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 405 and/or another server 415. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as the database can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, that is adapted to store, update, and retrieve data in response to SQL-formatted commands. The database might be controlled and/or maintained by a database server, as described above, for example.

Figure 5:
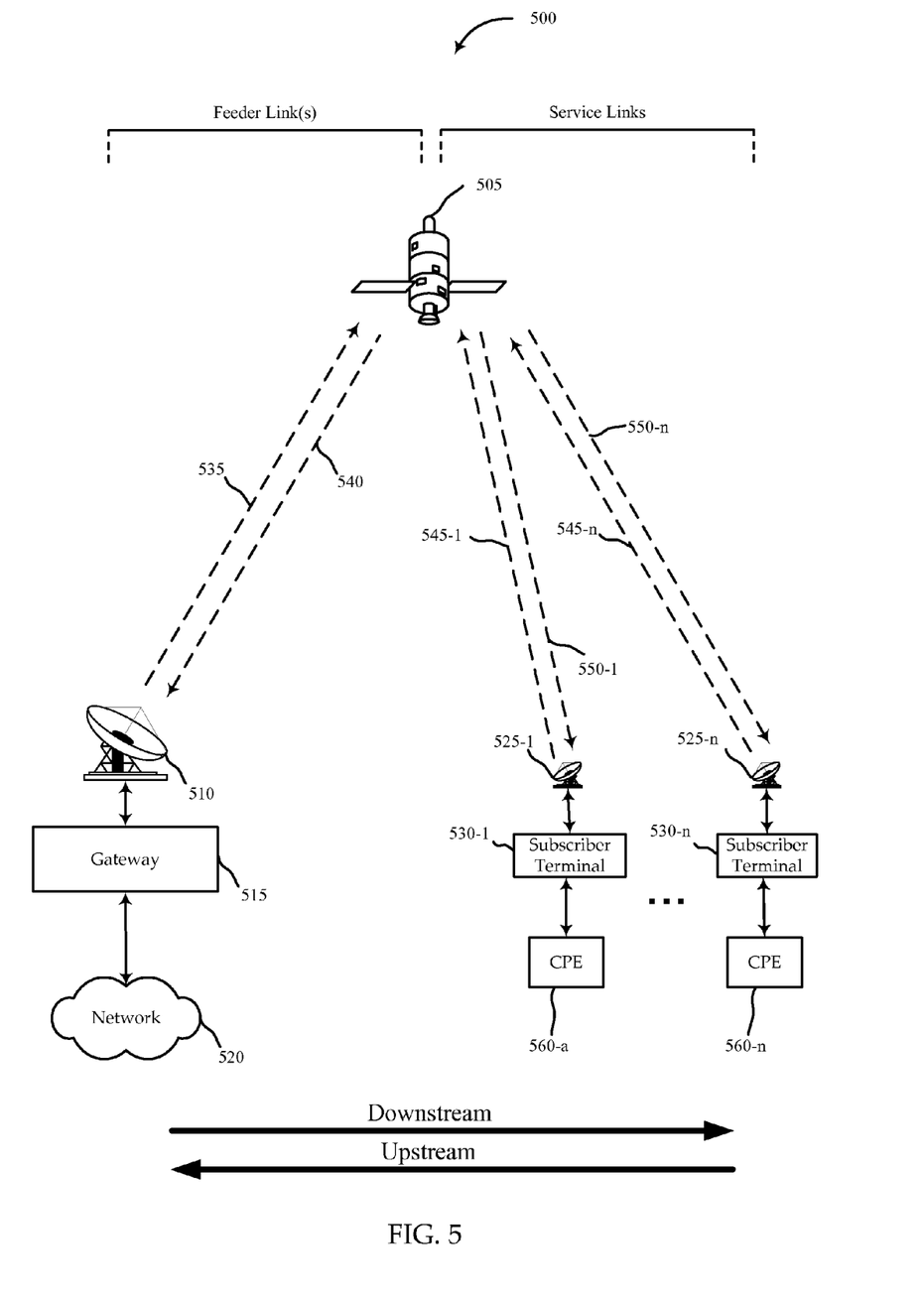
FIG. 5 is a block diagram illustrating a satellite communications system, which can be used in accordance with various embodiments of the invention.

Referring first to FIG. 5, a module diagram is shown of a satellite communications system 500 for use with various embodiments of the invention. The satellite communications system 500 includes a network 520, such as the Internet, interfaced with a gateway 515 that is configured to communicate with one or more subscriber terminals 530, via a satellite 505. A gateway 515 is sometimes referred to as a hub or ground station. Subscriber terminals 530 are sometimes called modems, satellite modems, or user terminals. As noted above, although the communications system 500 is illustrated as a geostationary satellite 505 based communication system, it should be noted that various embodiments described herein are not limited to use in geostationary satellite-based systems; for example, some embodiments could be low earth orbit ("LEO") satellite-based systems or aerial payloads not in orbit and held aloft by planes, blimps, weather balloons, etc. Other embodiments could have a number of satellites instead of just one.

The network 520 may be any type of network and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network supporting data communication between devices described herein, in different embodiments. A network 520 may include both wired and wireless connections, including optical links. As illustrated in a number of embodiments, the network 520 may connect the gateway 515 with other gateways (not shown), which are also in communication with the satellite 505.

The gateway 515 provides an interface between the network 520 and the satellite 505. The gateway 515 may be configured to receive data and information directed to one or more subscriber terminals 530, and can format the data and information for delivery to the respective destination device via the satellite 505. Similarly, the gateway 515 may be configured to receive signals from the satellite 505 (e.g., from one or more subscriber terminals 530) directed to a destination in the network 520, and can process the received signals for transmission along the network 520.

A device (not shown) connected to the network 520 may communicate with one or more subscriber terminals 530. Data and information, for example IP datagrams, may be sent from a device in the network 520 to the gateway 515. It will be appreciated that the network 520 may be in further communication with a number of different types of providers, including content providers, application providers, service providers, etc. Further, in various embodiments, the providers may communicate content with the satellite communication system 500 through the network 520, or through other components of the system (e.g., directly through the gateway 515).

The gateway 515 may format frames in accordance with a physical layer definition for transmission to the satellite 505. A variety of physical layer transmission modulation and coding techniques may be used with certain embodiments of the invention, including those defined with the DVB-S2 standard. The link 535 from the gateway 515 to the satellite 505 may be referred to hereinafter as the downstream uplink 535. The gateway 515 uses the antenna 510 to transmit the content (e.g., via signals) to the satellite 505. In one embodiment, the antenna 510 comprises a parabolic reflector with high directivity in the direction of the satellite and low directivity in other directions. The antenna 510 may comprise a variety of alternative configurations and include operating features such as high isolation between orthogonal polarizations, high efficiency in the operational frequency bands, and low noise.

In one embodiment, a geostationary satellite 505 is configured to receive the signals from the location of antenna 510 and within the frequency band and specific polarization transmitted. The satellite 505 may, for example, use a reflector antenna, lens antenna, array antenna, active antenna, or other mechanism known in the art for reception of such signals. The satellite 505 may process the signals received from the gateway 515 and forward the signal from the gateway 515 containing the MAC frame to one or more subscriber terminals 530. In one embodiment, the satellite 505 operates in a multibeam mode, transmitting a number of narrow beams, each directed at a different region of the earth, allowing for frequency re-use with a multicolor beam pattern.

With such a multibeam satellite 505, there may be any number of different signal switching configurations on the satellite 505, allowing signals from a single gateway 515 to be switched between different spot beams. In one embodiment, the satellite 505 may be configured as a "bent pipe" satellite, wherein the satellite may frequency-convert the received carrier signals before retransmitting these signals to their destination, but otherwise perform little or no other processing on the contents of the signals. There could be a single carrier signal for each service spot beam or multiple carriers in different embodiments. Similarly, single or multiple carrier signals could be used for the feeder spot beams. A variety of physical layer transmission modulation and coding techniques may be used by the satellite 505 in accordance with certain embodiments of the invention, including those defined with the DVB-S2 standard. For other embodiments, a number of configurations are possible (e.g., using LEO satellites, or using a mesh network instead of a star network), as will be evident to those skilled in the art.

The service signals transmitted from the satellite 505 may be received by one or more subscriber terminals 530, via the respective subscriber antenna 525. In one embodiment, the subscriber antenna 525 and terminal 530 together comprise a very small aperture terminal ("VSAT"), with the antenna 525 measuring approximately 0.6 meters in diameter and having approximately 2 watts of power. In other embodiments, a variety of other types of subscriber antennae 525 may be used at the subscriber terminal 530 to receive the signal from the satellite 505. The link 550 from the satellite 505 to the subscriber terminals 530 may be referred to hereinafter as the downstream downlink 550. Each of the subscriber terminals 530 may comprise a single user terminal or, alternatively, comprise a hub or router (not pictured) that is coupled to multiple user terminals.

In some embodiments, some or all of the subscriber terminals 530 are connected to consumer premises equipment ("CPE") 560. CPE may include, for example, computers, local area networks, Internet appliances, wireless networks, etc. A subscriber terminal 530, for example 530-*a*, may transmit data and information to a network 520 destination via the satellite 505. The subscriber terminal 530 transmits the signals via the upstream uplink 545-*a* to the satellite 505 using the subscriber antenna 525-*a*. The link from the satellite 505 to the gateway 515 may be referred to hereinafter as the upstream downlink 540.

In various embodiments, one or more of the satellite links (e.g., 535, 540, 545, and/or 550) are capable of communicating using one or more communication schemes. In various embodiments, the communication schemes may be the same or different for different links. The communication schemes may include different types of coding and modulation schemes. For example, various satellite links may communicate using physical layer transmission modulation and coding techniques, adaptive coding and modulation schemes, etc. The communication schemes may also use one or more different types of multiplexing schemes, including Multi-Frequency Time-Division Multiple Access ("MF-TDMA"), Time Division Multiple Access ("TDMA"), Frequency Division Multiple Access ("FDMA"), Orthogonal Frequency Division Multiple Access ("OFDMA"), Code Division Multiple Access ("CDMA"), or any number of hybrid or other schemes known in the art.

In a given satellite spot beam, all customers serviced by the spot beam may be capable of receiving all the content traversing the spot beam by virtue of the fact that the satellite communications system 500 employs wireless communications via various antennae (e.g., 510 and 525). However, some of the content may not be intended for receipt by certain customers. As such, the satellite communications system 500 may use various techniques to "direct" content to a subscriber or group of subscribers. For example, the content may be tagged (e.g., using packet header information according to a transmission protocol) with a certain destination identifier (e.g., an IP address) or use different modcode points. Each subscriber terminal 530 may then be adapted to handle the received data according to the tags. For example, content destined for a particular subscriber terminal 530 may be passed on to its respective CPE 560, while content not destined for the subscriber terminal 530 may be ignored. In some cases, the subscriber terminal 530 caches information not destined for the associated CPE 560 for use if the information is later found to be useful in avoiding traffic over the satellite link.

Figure 6:
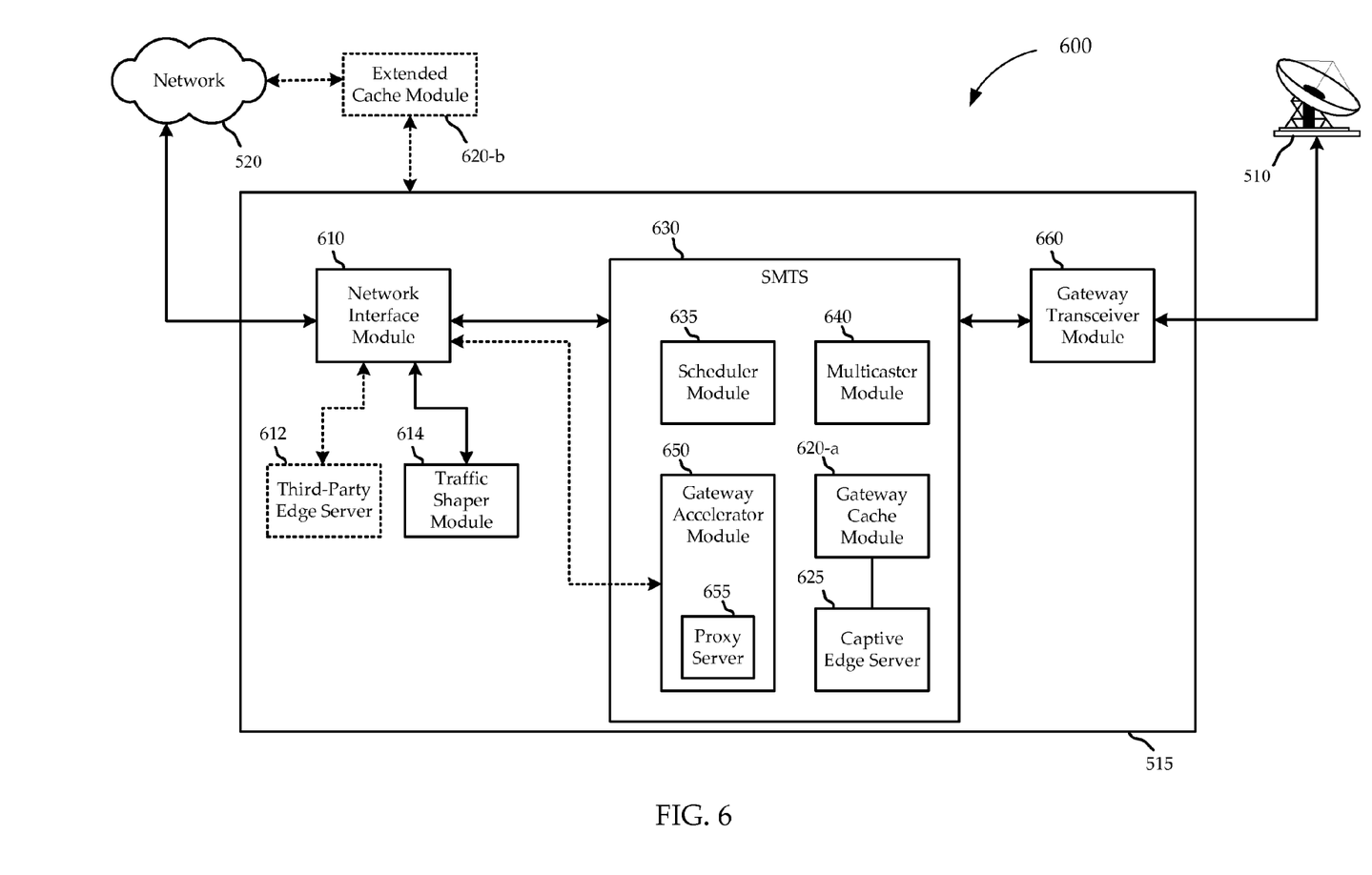
FIG. 6 is a block diagram illustrating a satellite gateway, which can be used in accordance with various embodiments of the invention.

It will be appreciated that many embodiments of gateways are possible for use in embodiments of communication systems, like the satellite communication system 500 of FIG. 5. FIG. 6 shows a simplified block diagram 600 illustrating an embodiment of a gateway 515 coupled between the network 520 and an antenna 510, according to various embodiments of the invention. The gateway 515 has a number of components, including a network interface module 610, a satellite modem termination system ("SMTS") 630, and a gateway transceiver module 660.

Components of the gateway 515 may be implemented, in whole or in part, in hardware. Thus, they may comprise one, or more, Application Specific Integrated Circuits ("ASICs") adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific controllers.

Embodiments of the gateway 515 receive data from the network 520 (e.g., the network 520 of FIG. 5), including data destined for one or more subscribers in a spot beam. The data is received at the network interface module 610, which includes one or more components for interfacing with the network 520. For example, the network interface module 610 includes a network switch and a router.

In some embodiments, the network interface module 610 interfaces with other modules, including a third-party edge server 612 and/or a traffic shaper module 614. The third-party edge server 612 may be adapted to mirror content (e.g., implementing transparent mirroring, like would be performed in a point of presence ("POP") of a content delivery network ("CDN")) to the gateway 515. For example, the third-party edge server 612 may facilitate contractual relationships between content providers and service providers to move content closer to subscribers in the satellite communication network 500. The traffic shaper module 614 controls traffic from the network 520 through the gateway 515, for example, to help optimize performance of the satellite communication system 500 (e.g., by reducing latency, increasing effective bandwidth, etc.). In one embodiment, the traffic shaper module 614 delays packets in a traffic stream to conform to a predetermined traffic profile.

Traffic is passed from the network interface module 610 to the SMTS 630 to be handled by one or more of its component modules. In some embodiments, the SMTS 630 includes a scheduler module 635, a multicaster module 640, a gateway accelerator module 650, a gateway cache module 620-*a*, and/or a captive edge server 625. Embodiments of the scheduler module 635 are configured to provide various functions relating to scheduling the links of the satellite communication system 500 handled by the gateway 515. For example, the scheduler module 635 may manage link bandwidth by scheduling license grants within a spot beam. Embodiments of the multicaster module 640 are configured to provide various functions relating to multicasting of data over the links of the satellite communication system 500. For example, the multicaster module 640 may determine whether data is unicast or multicast to one or more subscribers. In some embodiments, the multicaster module 640 and/or scheduler module 635 contribute to determinations of what modcodes to use, whether data should or should not be sent as a function of data cached at destination subscriber terminals 530, how to handle certain types of encryption, etc.

Embodiments of the gateway accelerator module 650 provide various types of application, WAN/LAN, and/or other acceleration functionality. In one embodiment, the gateway accelerator module 650 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the subscriber terminal 530 and/or CPE 560.

In some embodiments, the gateway accelerator module 650 is adapted to provide high payload compression. For example, the gateway accelerator module 650 may compress payload such that over 75% of upload traffic when browsing the web is being used by transport management, rather than payload data. In other embodiments, functionality of the gateway accelerator module 650 is closely integrated with the satellite link through components of the SMTS 630 to reduce upload bandwidth requirements and/or to more efficiently schedule to satellite link (e.g., by communicating with the scheduler module 635). For example, the link layer may be used to determine whether packets are successfully delivered, and those packets can be tied more closely with the content they supported through application layer information. In certain embodiments, these and/or other functions of the gateway accelerator module 650 are provided by a proxy server 655 resident on (e.g., or in communication with) the gateway accelerator module 650.

In some embodiments, functionality of the SMTS 630 is provided through the gateway cache module 620. Embodiments of the gateway cache module 620 include any useful type of memory store for various types of functionality of the gateway 515. For example, the gateway cache module 620 may include volatile or non-volatile storage, servers, files, queues, etc. Further, in certain embodiments, storage functionality and/or capacity is shared between an integrated (e.g., on-board) gateway cache module 620-$a$ and an extended (e.g., off-board) cache module 620-$b$. For example, the extended cache module 620-$b$ may be accessible by the gateway 515 via the network 520.

In certain embodiments, the gateway cache module 620 is in communication with the captive edge server 625. In some embodiments, the captive edge server 625 provides functionality similar to that of the third-party edge server 612, including content mirroring. For example, the captive edge server 625 may facilitate different contractual relationships from those of the third-party edge server 612 (e.g., between the gateway 515 provider and various content providers).

It will be appreciated that the SMTS 630 may provide many different types of functionality. For example, embodiments of the SMTS 630 oversee a variety of decoding, interleaving, decryption, and unscrambling techniques. The SMTS 630 may also manage functions applicable to the communication of content downstream through the satellite 505 to one or more subscriber terminals 530. In certain embodiments, some or all of these downstream communication functions are handled by the gateway transceiver module 660.

Embodiments of the gateway transceiver module 660 encode and/or modulate data, using one or more error correction techniques, adaptive encoding techniques, baseband encapsulation, frame creation, etc. (e.g., using various modcodes, lookup tables, etc.). Other functions may also be performed by these components (e.g., by the SMTS 630), including upconverting, amplifying, filtering, tuning, tracking, etc. The gateway transceiver module 660 communicates data to one or more antennae 510 for transmission via the satellite 505 to the subscriber terminals 530.

Figure 7:
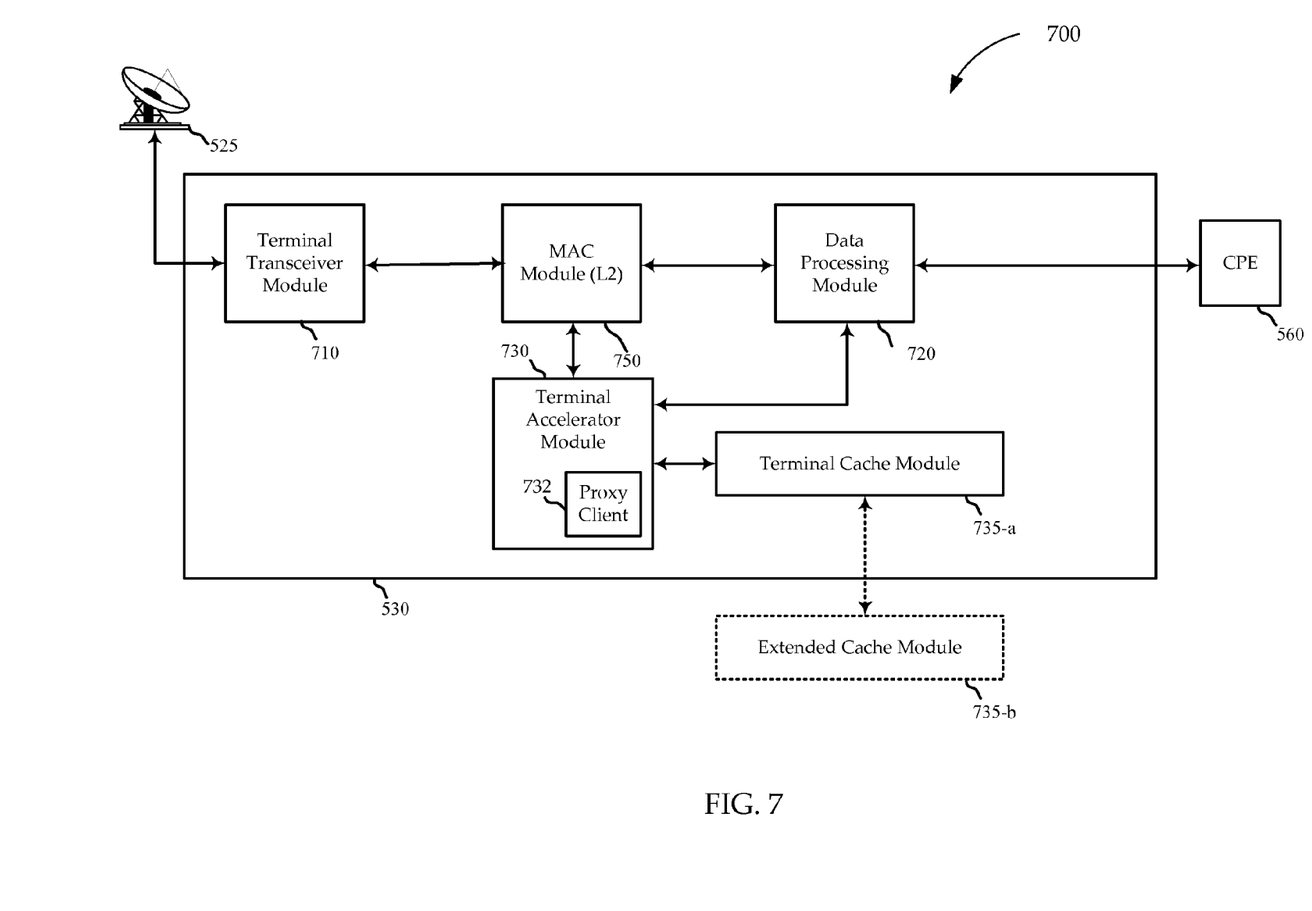
FIG. 7 is a block diagram illustrating multiple satellite subscriber terminals, which can be used in accordance with various embodiments of the invention.

FIG. 7 shows a simplified block diagram 700 illustrating an embodiment of a subscriber terminal 530 coupled between the respective subscriber antenna 525 and the CPE 560, according to various embodiments of the invention. The subscriber terminal 530 includes a terminal transceiver module 710, a data processing module 720, a terminal accelerator module 730, a terminal cache module 735, and a MAC module 750. The components may be implemented, in whole or in part, in hardware. Thus, they may comprise one, or more, Application Specific Integrated Circuits ("ASICs") adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific processors.

A signal from the subscriber antenna 525 is received by the subscriber terminal 530 at the terminal transceiver module 710. Embodiments of the terminal transceiver module 710 may amplify the signal, acquire the carrier, and/or downconvert the signal. In some embodiments, this functionality is performed by other components (either inside or outside the subscriber terminal 530). The downconverted signal is communicated to the data processing module 720 to be digitized and further processed.

Embodiments of the data processing module 720 provide various types of data processing functionality. For example, the data processing module 720 processes the received signal by interpreting (e.g., and decoding) modulation and/or coding schemes, interpreting multiplexed data streams, filtering the digitized signal, parsing the digitized signal into various types of information (e.g., by extracting the physical layer header), etc.

In some embodiments, the data processing module 720 is in communication with the terminal accelerator module 730. In some embodiments, the terminal accelerator module 730 provides substantially the same functionality as the gateway accelerator module 650, including various types of applications, WAN/LAN, and/or other acceleration functionality. In one embodiment, the terminal accelerator module 730 implements functionality of AcceleNet applications, like interpreting data communicated by the gateway 515 using high payload compression, handling various prefetching functions, parsing scripts to interpret requests, etc. In certain embodiments, these and/or other functions of the terminal accelerator module 730 are provided by a proxy client 732 resident on (e.g., or in communication with) the terminal accelerator module 730.

In some embodiments, output from the data processing module 720 and/or the terminal accelerator module 730 is stored in the terminal cache module 735. Further, the data processing module 720 and/or the terminal accelerator module 730 may be configured to determine what data should be stored in the terminal cache module 735 and which data should not (e.g., which data should be passed to the CPE 560). It will be appreciated that the terminal cache module 735 may include any useful type of memory store for various types of functionality of the subscriber terminal 530. For example, the terminal cache module 735 may include volatile or non-volatile storage, servers, files, queues, etc.

In certain embodiments, storage functionality and/or capacity is shared between an integrated (e.g., on-board) terminal cache module 735-$a$ and an extended (e.g., off-board) cache module 735-$b$. For example, the extended cache module 735-$b$ may be implemented in various ways, including as an attached peripheral device (e.g., a thumb drive, USB hard drive, etc.), a wireless peripheral device (e.g., a wireless hard drive), a networked peripheral device (e.g., a networked server), etc. In one embodiment, functionality of the terminal cache module 735 is implemented as storage integrated in the CPE 560 of FIG. 5.

Data destined for the CPE 560 (e.g., data not stored in the terminal cache module 735 or data retrieved from the terminal cache module 735) is communicated to the MAC module 750. Embodiments of the MAC module 750 prepare data for communication to the CPE 560. For example, the MAC module 750 may modulate, encode, filter, decrypt, and/or otherwise process the data to be compatible with the CPE 560.

In certain embodiments, the subscriber terminal 530 is configured to transmit data back to the gateway 515. Embodiments of the terminal transceiver module 710, the data processing module 720, the terminal accelerator module 730, the terminal cache module 735, and/or the MAC module 750 are configured to provide functionality for communicating information back through the satellite communication system 500 (e.g., for directing provision of services). For example, information about what is stored in the terminal cache module 735 may be sent back to the gateway 515 for limiting repetitious file transfers, as described more fully below.

It will be appreciated that the satellite communications system 500 may be used to provide different types of communication services to subscribers. For example, the satellite communications system 500 may provide content from the network 520 to a subscriber's CPE 560, including Internet content, broadcast television and radio content, on-demand content, voice-over-Internet-protocol ("VoIP") content, and/or any other type of desired content. It will be further appreciated that this content may be communicated to subscribers in different ways, including through unicast, multicast, broadcast, and/or other communications.

Embodiments of the invention include methods, systems, and devices that use multicasting, caching, and/or other techniques to provide novel satellite communication functionality. It will be appreciated that other components and systems may be used to provide functionality of the various embodiments described herein. As such, descriptions of various embodiments in the context of components and functionality of FIGS. 5-7 are intended only for clarity, and should not be construed as limiting the scope of the invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for implementing a dedicated shared byte cache, the system comprising:
   a gateway in communication with a content server, the content server configured to transfer content based on received requests for content, the gateway including a gateway accelerator module, wherein the gateway accelerator module includes a proxy server, the proxy server configured to receive content from the content server and to forward the content;
   a satellite in communication with the gateway, the satellite configured to transmit the received content;
   a subscriber terminal in communication with the satellite, the subscriber terminal configured to the content; and
   a plurality of client systems in communication with the subscriber terminal, the plurality of client systems each including a personal byte cache and configured to receive the content from the proxy server, to store the content in the personal byte caches, to synchronize the personal byte caches with each of the plurality of client system's portions of a shared byte cache at a dedicated shared byte cache server that is coupled to each of the plurality of client systems, and to retrieve the content from the shared byte cache.

2. A system for implementing a dedicated shared byte cache as in claim 1, wherein a request for content comprises identifying whether a sequence of bytes associated with content is stored in the dedicated shared byte cache server, and requesting the sequence of bytes from the dedicated shared byte cache server.

3. A non-transitory machine-readable medium having sets of instructions stored thereon which, when executed by a machine, cause the machine to:
   generate, at a plurality of client systems, requests for content;
   communicate, from the plurality of client systems to at least one content server via at a proxy server, the requests for the content;
   receive the content requested by each of the plurality of client systems at the corresponding client system;
   store, within a personal byte cache associated with each of the plurality of client systems, the requested content; and
   synchronize each of the personal byte caches with a shared byte cache at a dedicated shared byte cache server coupled to each of the plurality of client systems, wherein each of the plurality of client systems is apportioned a portion of the shared byte cache.

4. A machine-readable medium as in claim 3, wherein the sets of instruction, when executed by the machine, further cause the machine to:
   receive, at the dedicated shared byte cache server, content from a first client system of the plurality of client systems;
   store the content in the shared byte cache,
   receive a request from a second client system that includes a byte range in the cache that is associated with the first client system;

retrieve a sequence of bytes identified by the byte range from the shared byte cache in response to the request from the second client system; and retrieve, by the second client system, the sequence of bytes from the shared byte cache.

5. A machine-readable medium as in claim 3, wherein the sets of instruction, when executed by the machine, further cause the machine to, in response to the proxy server transferring content to the plurality of client systems, store, at the proxy server, a record for each of the plurality of client systems of the content stored within the personal byte caches.

6. A method comprising:

generating, at a plurality of client systems, requests for content;

communicating, from the plurality of client systems to at least one content server via at a proxy server, the requests for the content;

receiving the content requested by each of the plurality of client systems at the corresponding client system;

storing, within a personal byte cache associated with each of the plurality of client systems, the content; and synchronizing each of the personal byte caches with a shared byte cache at a dedicated shared byte cache server coupled to each of the plurality of client systems, wherein each of the plurality of client systems is apportioned a portion of the shared byte cache.

7. The method of claim 6 further comprising:

receiving, at the dedicated shared byte cache server, at least a portion of the content from a first client system of the plurality of client systems;

storing the portion of the content in the shared byte cache, receiving a request from a second client system that includes a byte range in the cache that is associated with the first client system;

retrieving a sequence of bytes identified by the byte range from the shared byte cache in response to the request from the second client system; and receiving, by the second client system, the sequence of bytes from the shared byte cache.

8. The method of claim 6 further comprising, in response to the proxy server transferring content to the plurality of client systems, storing, at the proxy server, a record for each of the plurality of client systems of the content stored within the personal byte caches.

* * * * *